United States Patent [19]

Tandon et al.

[11] 3,883,515

[45] May 13, 1975

[54] ADIABATIC PROCESS FOR THE PRODUCTION OF 2,4-DICHLORO-6-AMINO-S-TRIAZINES

[75] Inventors: Jai Prakash Tandon, Cranston; William Sandford Durrell, East Greenwich, both of R.I.

[73] Assignee: Ciba-Geigy Corporation, Ardsley, N.Y.

[22] Filed: Mar. 14, 1973

[21] Appl. No.: 341,019

Related U.S. Application Data

[63] Continuation of Ser. No. 888,845, Dec. 29, 1969, abandoned, which is a continuation-in-part of Ser. No. 787,418, Dec. 27, 1968, abandoned.

[52] U.S. Cl. ............................ 260/240 B; 260/249.5
[51] Int. Cl. ............................................ C07d 55/18
[58] Field of Search ................... 260/240 B, 249.5

[56] References Cited
UNITED STATES PATENTS

| | | | |
|---|---|---|---|
| 2,459,435 | 1/1949 | Keller et al. | 260/240 X |
| 3,235,359 | 2/1966 | Acker | 260/249.5 X |
| 3,403,151 | 9/1968 | Knusli et al. | 260/249.5 |
| 3,429,881 | 2/1969 | Knusli et al. | 260/249.5 X |
| 3,459,743 | 8/1969 | Zussman et al. | 260/240 |
| 3,479,349 | 11/1969 | Allison et al. | 260/240 |
| 3,503,971 | 3/1970 | Neighbors et al. | 260/249.5 X |
| 3,505,325 | 4/1970 | Schwarze | 260/249.5 X |
| 3,681,337 | 8/1972 | Petree | 260/249.5 X |

*Primary Examiner*—John M. Ford

[57] ABSTRACT

A method for the production of 2,4-dichloro-6-mono substituted amino-s-triazines by reacting, in a solvent medium containing water, under substantially adiabatic conditions and for a relatively short period of time, cyanuric chloride with (a) a primary or secondary amine or (b) an amino compound containing in the molecule at least one water-solubilizing group such as a carboxylic acid or a sulfonic acid group. One group of products obtained by the process of the present invention are intermediates useful in the preparation of 2-chloro-4,6-diamino-chloro-s-triazine products which are employed in inhibiting the growth of undesirable plants and are therefore extremely important and valuable for use as herbicides. Another group of compounds obtained by the present process are useful as intermediates in the production of optical brighteners or dyestuff components.

19 Claims, No Drawings

3,883,515

ADIABATIC PROCESS FOR THE PRODUCTION OF 2,4-DICHLORO-6-AMINO-S-TRIAZINES

CROSS-REFERENCE

This application is a continuation of Ser. No. 888,845, filed Dec. 29, 1969, which is a continuation-in-part of Ser. No. 787,418, filed Dec. 27, 1968, both now abandoned.

FIELD OF THE INVENTION

The present invention relates to an unusual and extremely rapid procedure for the production, in very high purity and in high yield, of 2,4-dichloro-6-mono-substituted amino-s-triazines by a process involving reacting cyanuric chloride with (a) a primary or secondary amine or (b) an amino compound containing in the molecule at least one water-solubilizing group, the reaction being conducted under substantially adiabatic conditions for a relatively short period of time, and in a solvent medium containing water.

One group of products obtained by the present process, that is, one group of 2,4-dichloro-6-mono-substituted amino-s-triazines, are intermediates useful in the preparation of diamino compounds which are employed in inhibiting the growth of undesirable plants and vegetation. Such diamino compounds are therefore extremely valuable and of great commercial importance as herbicides. Especially valuable commercial diamino compounds which are used as herbicides include such compounds as atrazine (2-chloro-4-ethylamino-6-isopropylamino-s-triazine), propazine (2-chloro-4,6-bis-isopropylamino-s-triazine), simazine (2-chloro-4,6-bis[ethylamino]-s-triazine, and the like. These diamino compounds are employed both as selective herbicides for weed control among cultivated plants and as soil sterilants used in the total elimination of undesired plants.

The 2,4-dichloro-6-mono-substituted amino-s-triazines obtained by the process of the present invention are converted to the aforementioned commercially valuable diamino compounds by reaction with an equivalent amount of the same or a different primary or secondary amine. Thus, the one group of products of the present invention referred to above that is, the aforementioned 2,4-dichloro-6-mono-substituted amino-s-triazines, are reacted with amines such as ethylamine, isopropylamine, or like amines, to produce the aforementioned commercially valuable diamino herbicidal products.

Accordingly, a typical embodiment of the present invention involves reacting cyanuric chloride under adiabatic conditions in a two phase organic/aqueous medium, with a sterically unhindered mono-substituted amine such as, for example, isopropylamine, to obtain, for example, 2,4-dichloro-6-isopropylamino-s-triazine.

Another group of compounds obtained by the present process that is, a second group of 2,4-dichloro-6-mono-substituted amino-s-triazines, are intermediates useful in the production of commercially valuable optical brighteners. Thus, amino compounds serving as optical brightener starting materials containing in their molecule at least one water-solubilizing group that is, a carboxylic acid or a sulfonic acid group, are prepared, in high yield and in very high purity, by the present process. These starting amino compounds can be either in the free acid form or in the form of their water-soluble salts that is, alkali metal salts. Suitable amino compounds of this type are amino-substituted stilbene-2,2'-disulfonic acids which are well known optical brightener starting materials.

Thus, according to the present process, cyanuric chloride is reacted with 4,4'-diaminostilbene-2,2'-disulfonic acid (or an alkali metal salt thereof) so as to obtain a 2,4-dichloro-6-mono-substituted amino-s-triazine. This intermediate product is then reacted with aniline and then the remaining two chlorine atoms in the 4,4'-bis-[2''-phenylamino-4''-chloro-s-triazinyl-(6'')-amino]-stilbene-2,2'-disulfonic acid are exchanged for N-methyl-ethanolamine radicals by heating the mixture containing the last mentioned compounds. There is thus obtained, the commercially valuable optical brightener compound that is, 4,4'-bis-[2''-phenylamino-4''-(N-methyl-β-hydroxyethylamino)-s-triazinyl-6'')-amino]-stilbene-2,2''-disulfonic acid.

DESCRIPTION OF THE PRIOR ART 2,4-dichloro-6-mono-substituted amino-s-triazines are known compounds and are generally prepared by reacting cyanuric chloride with (1) mono-substituted amines or (2) amino compounds containing in the molecule at least one water-solubilizing group such as a carboxylic or a sulfonic acid group, at low temperatures and in the presence of a solvent. When using such a procedure, the art teaches that it is necessary to maintain the reaction mixture at a low temperature when exchanging the first chlorine atom of the cyanuric chloride molecule for an amino group in order to avoid undesirable formation of by-products due to hydrolysis. The prior art also teaches that it is necessary to neutralize the HCl formed in the reaction with either (1) an excess of the amine reactant or (2) an acid acceptor such as sodium hydroxide, sodium carbonate, and the like. Neutralization of the HCl by the use of an excess amine reactant or an acid acceptor obviously complicated the recovery of the desired 2,4-dichloro-6-mono-substituted amino-s-triazine intermediate product and was also undesirable from an economic point of view. In addition, the failure to neutralize the HCl generally adversely affected the yield of the aforesaid desired amino-s-triazine. Still another alternative to neutralizing or removing the HCl was the use of a distillation procedure (employing high temperatures) and this too was undesirable since it introduced a further step in the procedure for preparing the desired 2,4-dichloro-6-mono-substituted amino-s-triazine.

U.S. Pat. No. 3,328,399 discloses a process for preparing amino-s-triazines without neutralizing the HCl formed in the reaction. However, this patent discloses only a procedure involving reacting cyanuric chloride with secondary amines in an anhydrous system and the HCl formed is distilled off from the reaction mixture.

Further, early experimental work involving the reaction of methyl and ethylamine hydrochlorides with cyanuric chloride in an anhydrous system indicated that reaction occurred only at extremely high temperatures, that is, at temperatures of 200°C and higher. However, it was found that in addition to the desired 2,4-dichloro-6-mono-substituted amino-s-triazines which were obtained, there was also obtained large amounts of unknown and undesirable by-products.

In reactions used to prepare intermediates for optical brighteners or dyestuff components, involving cyanuric chloride and amino compounds containing in the molecule at least one water-solubilizing group such as a carboxylic acid or a sulfonic acid group and illustratively, diaminostilbenedisulfonic acid, the procedure was rather complicated and unsuitable for large scale production as the addition of diaminostilbenedisulfonic acid would take up to about 45 minutes. Then the reaction mixture had to be maintained at a low temperature to minimize hydrolysis and formation of undesirable by-products. Further, it was not easily possible to add the 100% stoichiometric amount of the diaminostilbenesulfonic acid as it was necessary to titrate to the end point with the aforesaid amino compound.

SUMMARY OF THE INVENTION

In accordance with the process of the present invention, 2,4-dichloro-6-mono-substituted amino-s-triazines are obtained not only in extremely high purity and in high yield but also very rapidly, by a fairly simple and practical procedure involving the reaction, under substantially adiabatic conditions in a solvent medium containing water, of cyanuric chloride with a primary or secondary amine or an amino compound containing in the molecule at least one water-solubilizing group. Using the present procedure, the concomitant formation of undesirable by-products is minimized and almost substantially eliminated and the desired mono-substituted amino product thus obtained can be reacted further to produce either the commercially valuable 2-chloro-4,6-diamino-s-triazine products which are characterized by herbicidal activity or commercially valuable optical brighteners of the type described supra.

The reaction between cyanuric chloride and the aforementioned primary or secondary amine or amino compound is carried out in a solvent medium containing water under substantially adiabatic conditions.

The present procedure accordingly provides some important advantages over procedures hitherto used in the preparation of 2,4-dichloro-6-mono-substituted amino-s-triazines. First, the present process is an extremely rapid one as the desired 2,4-dichloro-6-mono-substituted amino-s-triazines are obtained within a matter of minutes and at times even within the space of one to two minutes. In addition, when cyanuric chloride is reacted with a primary or secondary amine, the desired products are obtained in extremely high purity, that is, a purity as high as 99.0 percent and in yields of up to 99.6 percent. Similarly, when cyanuric chloride is reacted with the indicated amino compound, the resulting products are obtained in very high yield and extremely high quality. Obviously, by the use of the present procedure, by-products are obtained in minimal amounts thereby avoiding the need for expensive and complicated procedures for removal of said by-products.

PREFERRED EMBODIMENTS OF THE INVENTION

In accordance with a preferred embodiment of the present invention, cyanuric chloride is reacted with a (a) primary or secondary amine or (b) an amino compound containing in the molecule at least one water-solubilizing group such as a carboxylic or a sulfonic acid group, under substantially adiabatic conditions in a solvent medium containing water and suitably, a two phase organic/aqueous medium, to obtain a 2,4-dichloro-6-amino-s-triazine, in extremely high purity and in high yield. The reaction proceeds with extreme rapidity and is actually completed within a metter of minutes and generally, in about one or two minutes. The products are characterized by extremely high purity that is purity as high as 99.9 percent and very high yields that is, yields of up to 99.6 percent have been obtained.

The process involving the reaction between cyanuric chloride and the primary or secondary amine is conducted at a temperature between 0° and 100°C and suitably between about 25°C and 85°C. The process involving the reaction between cyanuric chloride and the amino compound to form an intermediate useful in the production of an optical brightener (or dyestuff) is conducted at a lower temperature that is at a temperature not exceeding about 28° and as low as about −8°C.

The products of the present invention, that is, the 2,-4-dichloro-6-mono-substituted amino-s-triazines are obtained by reacting a primary or secondary amine or an amino compound containing a carboxylic or sulfonic acid group. Such amine products are represented by the formula

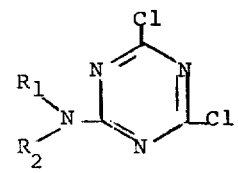

wherein

R₁ is a lower molecular alkyl, alkenyl or cycloalkyl radical containing up to 6 carbon atoms, R₂ is hydrogen, a lower molecular aliphatic hydrocarbon radical the chain of which can be substituted by the hydroxyl group or by halogen or which can be interrupted by oxygen or sulphur, R₁ and R₂ together with the adjacent nitrogen atom also represent the pyrrolidino, morpholino, pyridazino, or piperidino radical.

Illustrative amines are methylamine, dimethylamine, ethylamine, diethylamine, propylamine, isopropylamine, di-n-propylamine, methylpropylamine, ethylpropylamine, n-butylamine, sec.butylamine, isobutylamine, tert. butylamine, n-amylamine, sec. amylamine, isoamylamine, cyclohexylamine, allylamine, methallylamine, γ-methoxypropylamine, γ-ethoxypropylamine, β-methoxyethylamine, β-ethoxyethylamine, γ-propoxypropylamine, γ-isopropoxypropylamine, ethanolamine, propanolamine, cyclopropylamine, cyclobutylamine, cyclohexylamine, and the like.

Suitably, the cyanuric chloride is introduced into the reaction mixture in an inert organic solvent medium. Illustrative solvents are toluene, benzene, xylene, acetone and methylethylketone. When the cyanuric chloride is reacted with the amino compound containing a carboxylic or sulfonic acid group, the use of acetone and methylethylketone is preferred.

It has also been found suitable to premix the alkali metal acid acceptor and the amine or amino compound and then proceed to react the mixture with cyanuric chloride.

One illustrative embodiment of the present invention involves the preparation of a 2,4-dichloro-6-mono-substituted amino-s-triazine such as, for example, 2,4-dichloro-6-isopropylamino-s-triazine by reacting cyanuric chloride with isopropylamine under substantially adiabatic conditions in a solvent medium containing water and suitably a two phase organic/aqueous medium. Preferably, the cyanuric chloride should be added to the mixture, in an inert organic solvent medium. The selected solvent should not only be non-reactive but in addition, should not hinder or adversely affect the course of the reaction. Another requirement for the solvent is that it should be easily dried. Operative solvents include toluene, benzene, xylene, acetone, methylethylketone, and the like.

The acid acceptors which can be used in this embodiment of the present process include, for example, the reactant amine per se, alkali metal hydroxides, alkali metal carbonates, and the like. Specific alkali metal acceptors include, for example, sodium hydroxide, sodium carbonate, potassium hydroxide, potassium carbonate, and the like. Usually, aqueous solutions of such alkali metal acid acceptors are employed and generally a 50 percent sodium hydroxide solution is used although solutions containing more or less than 50 percent of the selected alkali metal acid acceptor can be used.

Generally, stoichiometric amounts of the reactants are used that is, about 1 mole of amine, about 1 mole of the cyanuric acid chloride and about 1 mole of the alkali metal acid acceptor are employed. However, where the amine is used as an acid acceptor, generally about 2 moles of said amine are used for each mole of cyanuric chloride.

Illustratively, in the preparation of 2,4-dichloro-6-isopropylamino-s-triazine, one embodiment of the invention, the cyanuric chloride and isopropylamine are reacted, under substantially adiabatic conditions in a continuous reactor and illustratively, a plug flow reactor. Thus, for example, water, a 50 percent sodium hydroxide solution and isopropylamine are mixed in a mixing tank and then the mixture is passed on to a continuous reactor. Simultaneous with the feeding of said mixture to the aforesaid reactor, a solution of cyanuric chloride in toluene is fed to said reactor where the reaction occurs and within a relatively short period of time, that is, in about 1-2 minutes, the desired 2,4-dichloro-6-mono-substituted amino-s-triazine product is obtained. The reaction is a continuous one, that is, there is substantially a continuous feed flow into the reactor of the reactants and a continuous feed flow out of the reactor of the desired 2,4-dichloro-6-mono-substituted amino-s-triazine.

Another embodiment of the present invention covers the procedure used in preparing intermediates useful in the production of optical brighteners, dyestuff components and dyestuff containing triazinyl groups which render them fiber-reactive.

Amino compounds useful as intermediates in the preparation of optical brighteners, dyestuff components or dyestuffs containing in their molecule at least one water-solubilizing group that is, a carboxylic acid or a sulfonic acid group, are obtained by the present process. Such amino compounds are suitably used in the free acid form or, at times, in the form of their water soluble salts that is, alkali metal salts.

Especially suitable amino compounds are amino-substituted stilbene-2,2'-disulfonic acids which are known optical brightener starting materials, dyestuff components such as metanilic acid or naphthalene-sulfonic acid such as, for example, H-acid, or amino-anthraquinone-sulfonic acids or amino-substituted azo-dyestuffs or amino-substituted anthraquinone dyestuffs.

In the embodiment of the invention covering the preparation of an intermediate 2,4-dichloro-6-amino-s-triazine which is useful in the preparation of an optical brightener, dyestuff, dyestuff component, or the like, the process is suitably conducted at a temperature not exceeding about 28°C and usually, at a lower temperature that is, a temperature of about −8°C.

Where the cyanuric chloride is reacted with the 4,4'-diamino-stilbene-2,2'-disulfonic acid, it has been found highly desirable to make two separate additions of the aforesaid acid; in the first addition, 96 percent of the theoretical amount is added within about 1 to 2 minutes followed by the addition of the remaining 4,4'-diamino-stilbene-2,2'-disulfonic acid within a period not exceeding about 10 minutes. By using these separate additions, it has been found that not only is an extremely high yield obtained, but in addition, the product is of extremely high quality. In addition, the formation of by-products is avoided. Where reference is made to a higher quality product this is meant to indicate a product characterized by a better optical yield and minimal undesirable by-product formation.

During the reaction between the cyanuric chloride and the diaminostilbenedisulfonic acid, the mixture is maintained at a pH between about 6 and 7. Suitable acid acceptors are sodium carbonate or potassium carbonate. A suitable temperature range is between about minus 8°C and 28°C.

As indicated above, the reaction involving the preparation of the desired 2,4-dichloro-6-mono-substituted amino-s-triazine is an extremely rapid one and the product is obtained in the matter of minutes, that is, in some instances, even within about a minute or two. The reactor which has been used in the present process is a continuous reactor, of a small volume, and suitably, a plug flow reactor, as illustrated in FIG. 1. In such a reactor, the reactants are fed in at a fairly rapid rate, the reaction occurs within a very short period of time and the desired product is then fed out of the reactor. It is therefore possible, using such a reactor, to run the reaction almost continuously under substantially adiabatic conditions and securing the desired product in a fairly short period of time and by such a procedure, the reaction can be efficiently run so as to obtain the desired product, in fairly high volume.

With specific reference to said FIG. 1, a schematic flow diagram illustrates the use of a continuous reactor for the preparation of 2,4-dichloro-6-mono-substituted amino-s-triazine by reacting cyanuric chloride with isopropylamine as an acid acceptor under substantially adiabatic conditions. In the system illustrated, a water stream 10, an isopropyl amine (IPA) feed stream 11, a toluene feed stream 12 containing cyanuric chloride reactant (CC) dissolved therein are fed into a continuous reactor 13 having a volume of two gallons. The flow rates of the separate feed streams are regulated so as to provide substantially stoichiometric quantities of the several materials reacted. Control of the respective proportions of the cyanuric chloride and isopropylamine is quite important in order to assure formation of the desired 2,4-dichloro-6-mono-substituted amino-s-triazine product. Within about one-two minutes, the reaction is complete; the 2,4-dichloro-6-mono-substituted amino-s-triazine product is passed through decanter 14 and then onto the Atrazine reactor for conversion to the final 2-chloro-4-ethylamino-6-isopropylamino-s-triazine final product. The by-products of the reaction pass from the decanter to the stripper 15. Alternatively, where an amino compound is used containing in the molecule at least one water-soluble group such as a carboxylic or a sulfonic acid group and illustratively, 4,4'-diamino-stilbene-2,2'-disulfonic acid, the resulting 2,4-dichloro-6-mono-substituted amino-s-triazine can be passed on to a 2nd stage involving reaction with aniline and then on to succeeding stages to obtain the desired commercially valuable optical brightener 4,4'-bis-[2''-phenylamino-4'''-(N-methyl-β-hydroxyethylamino)-s-triazinyl-(6'')-amino]-stilbene-2,2'-disulfonic acid.

FIG. 2 is a further schematic drawing, illustrating a modification of the apparatus as well as the process. Thus, a water stream 16, a sodium hydroxide stream 17 and an isopropylamine (IPA) feed stream 18 are fed into a mixing tank 19. The aforesaid materials are premixed in said mixing tank 19 and the mixture is then fed together with a toluene stream 20 containing cyanuric chloride reactant (CC) dissolved therein into the continuous reactor 21. The product 2,4-dichloro-6-isopropylamino-s-triazine passes out through the reactor 21 to the decanter 22 and then on to the Atrazine reactor. The flow rates of the several feed streams are regulated in order to insure substantially stoichiometric quantities of the several materials reacted. Control of the respective proportions of the cyanuric chloride, isopropylamine and sodium hydroxide (or other alkali metal hydroxide acceptor or alkali metal carbonate) is important so as to assure formation of the desired 2,4-dichloro intermediate and, ultimately, the desired mixed diamino product, in high yields and purities.

The following non-limitative examples serve to illustrate the process of the invention.

EXAMPLE I

To a solution of 92.2 grams (0.5 mole) of cyanuric chloride in 500 g of toluene, at 24°C, in a 4-neck round bottom flask fitted with a dropping funnel, a stirrer, a condenser and a thermometer, was added a solution of 29.6 g (0.5 mole) of isopropylamine and 20.0 g (0.5 mole) of sodium hydroxide in 500 g of water at 24°C in ten seconds, accompanied by stirring. The reaction mixture temperature rose to 75°C in less than 30 seconds. At the end of 60 seconds, analysis showed a product distribution of 99.8% 2,4-dichloro-6-isopropylamino-s-triazine, 0.2% 2,4-bis-isopropylamino-s-triazine and traces of cyanuric chloride.

EXAMPLE II

A reactant feed of 59.1 (1.0 mole) lbs./hr. isopropylamine, 81.8 (1.02 mole) lbs./hr. 50% sodium hydroxide and 359.1 lbs./hr of water w s added to a mixing tank and the resulting mixture w. passed, simultaneously with 1,230 lbs./hr. 15% cy... uric chloride in toluene solution into a continuous reactor, i.e., a plug flow reactor, of a volume of 1.1 gallons. The reaction was commenced at a temperature of 31°C under adiabatic conditions. The feed out temperature was 75°C. On analysis, the conversion was found to be 99.5% with a yield of 98.5% and the purity of the 2,4-dichloro-6-isopropylamino-s-triazine product was 99.0%.

EXAMPLE III

A reactant feed of 118.2 (2.0 moles) lbs./hr. isopropylamine, 381.8 lbs./hr. water and 1230 lbs./hr. 15% cyanuric chloride in toluene was passed into a continuous reactor of a volume of 2 gallons. The feed in temperature was 30°C and the feed out temperature was 75°C. A conversion of 99.5% was obtained; a yield of 99.5% and a purity of 99.0% of 2,4-dichloro-6-isopropylamino-s-triazine was obtained.

EXAMPLE IV

To a solution of 100 g cyanuric chloride (0.54 mole) in 850 g. of 88% methylethylketone at −8° to 10°C in a 5 liter five neck round bottom flask fitted with a stirrer, a thermometer, a funnel, a pH electrode and inlet-out for the recirculation of the reaction mass was added in with stirring a solution (25°C) of 95 g DAS (0.2575 mole) and 27.2 g $Na_2CO_3$ (0.2575 mole) in 1625 g. of water in less than 20 seconds. At the end of this addition the reaction mixture temperature reached 28°C within 30 seconds and the pH of the reaction mixture was adjusted to 6.0. The automatic analyzer shows the absence of DAS (5ppm) in the reaction mixture and the remaining 5% of $DAS/Na_2CO_3$ solution was added through the automatic titrator control to a 100 ppm DAS concentration. This corresponds to 0.25% DAS and 0.5% CC left in the reaction mixture. At the end of this time the normal procedure was used to finish the procedure for preparing the optical brightener product as described in Example V below.

EXAMPLE V

Into a 5 liter five neck round bottom flask equipped with a stirrer with 5'' teflon blade, combination pH electrode, thermometer, recirculation inlet and outlet tubes fitted in a size 4 rubber stopper, and a dropping funnel, 850 g of 88% methylethylketone is charged and cooled to −5° to −8°C. 100 g Cyanuric chloride (CC) (0.540 mole) is added with stirring. Immediately after the CC is charged, a solution of 95 g diaminostilbenedisulfonic acid (DAS) 100%, M.W. 370, 0.2565 mole) as an approximately 5.8% aqueous solution (w/v) of its disodium salt also containing 28.6 g of $Na_2CO_3$ (0.270 mole) in 1650 g total of aqueous solution is added through the funnel in the least possible time (about 20 seconds up to 2 minutes) with vigorous agitation but with no cooling. In about one minute the reaction mixture temperature will reach about 26° ± 2°C and the pH of the reaction mixture will be between 6 and 7. If the reaction mixture pH is lower than 6.0 then it is adjusted to 6.0 by the addition of the required amount of a 10% $Na_2CO_3$ solution. The remaining stoichiometric amount of $DAS/Na_2CO_3$ solution (9.5 g DAS (100%, m.w. 430), and 2.86 g $Na_2CO_3$ in 165 g total solution) is added at rate of 10–15 ml/min. while the pH of the reaction mixture is kept in a range of 6–7 until a 100 ppm DAS concentration in the reaction mixture is reached. The reaction mixture is stirred for one minute and to the stirred reaction mass is added, all at once, 50.2 g aniline (0.540 mole). During the addition, the pH will first rise then drop to 4.0–5.0 and the temperature will rise from 26° ± 2°C to the range of 33° ± 2°C. After the aniline feed is complete, about 43.2 g of 50% NaOH is added over the period required during which the pH is maintained in the 8–9 range and the temperature is increased by heating in about 10 minutes period to 60° C. The reaction mixture is stirred, kept at 60°C and a pH of 9.0 for 10 minutes. A very light yellow turbid solution should be present at this point. The funnel is replaced with a dropping funnel and there is added all at once 45.8 g of N-methylethanolamine (0.610 mole, 13% excess). The reaction mixture temperature will rise to 67° ± 1°C. The initial pH of 10–11 drops rapidly. The addition of about 43.2 g of 50% NaOH (0.540 mole) is started while maintaining the pH in the range of 10–11 and the temperature in the range of 70° ± 2°C and the pH is maintained in the range of 10–11. At the end of this time, 350.0 g of NaCl is added and azeotropic removal of methylethylketone is begun. When about 80% of MEK is recovered and the reaction mixture temperature reaches at about 75°–76°C, the MEK removal is stopped and the reaction mixture kept under total reflux for about 20 minutes. When the product turns into beads, some seed crystals of the desired optical brightener product, 4,4′-bis-[2″-phenylamine-4″-(N-methyl-β-hydroxyethylamino)-s-triazinyl-(6″)-amino]-stilbene-2,2′-disulfonic acid light, (1.0 g) are added for seeding. The mixture is then stirred for another 10 minutes. Now the distillation of the remaining MEK is resumed to a final 100°–103°C pot temperature. The slurry is cooled to 25°C, filtered, washed with 2,000 ml of 1.5% NaCl solution and then with 500 ml of 20% NaCl solution. The product is dried in vacuo at 100°C. About 280 ± 20 g of the aforesaid dry optical brightener product is obtained. The dry product is routinely analyzed for % NaCl, % $H_2O$ (by Karl Fisher), % Fluorescence, discoloration tests, and impurities by TLC (Fluorescent and non-fluorescent). The fluorescence yield based on the CC charge is calculated as follows:

Fluor. yield + (Wt. of Produce × % Fluorescence/100) and is 280 ± 10.

EXAMPLE VI

To a mixture of 50.0 g cyanuric chloride (0.270 mole) and 50.0 g dry acid powder DAS (0.129 mole) in 425 g of 88% MEK at −8°C in a 3 liter five neck round bottom flask fitted with a stirrer, a thermometer, a funnel and a pH electrode is added, with stirring, a 3.5% $NA_2CO_3$ solution (at 25°C) to a pH of 6.5 in less than 60 seconds (28.0 g $Na_2CO_3$ in 800 ml solution). The reaction mixture temperature will reach to 26° ± 2°C at the end of $Na_2CO_3$ solution addition. At the end of this time the normal procedure for preparing the optical brightener product of Example V is used.

What is claimed is:

1. A process for the preparation of a 2,4-dichloro-6-mono-substituted amino-s-triazine which comprises reacting, under adiabatic conditions and in a two-phase organic aqueous solvent medium, cyanuric chloride with
   a. a primary or secondary amine of the formula $R_1R_2NH$ wherein $R_1$ is a lower alkyl, alkenyl or cycloalkyl radical containing up to 6 carbon atoms, $R_2$ is hydrogen, a lower alkylene radical the chain of which can be substituted by the hydroxyl group or by halogen or which can be interrupted by oxygen or sulphur, $R_1$ and $R_2$ together with the adjacent nitrogen atom also represent the pyrrolidino, morpholino, pyridazino, or piperidino radical; or
   b. an amino compound containing at least one water-solubilizing group selected from among carboxylic and sulfonic acid groups, said amino compound being selected from among amino-substituted stilbene-2,2′-disulfonic acids, benzene sulfonic acids, naphthalenesulfonic acids and anthraquinone sulfonic acids.

2. A process according to claim 1 wherein the reaction is conducted in the presence of an alkali metal acid acceptor.

3. A process according to claim 2 wherein the alkali metal acid acceptor is an alkali metal hydroxide or carbonate.

4. A process according to claim 1 wherein the reaction is conducted at a temperature between about −8°C and 100°C.

5. A process according to claim 4 wherein the reaction is conducted at a temperature of about 25°C to about 85°C.

6. A process according to claim 1 wherein substantially stoichiometric amounts of the reactants are employed.

7. A process according to claim 1 wherein the cyanuric chloride is introduced into the reaction mixture in an inert organic solvent medium.

8. A process according to claim 7 wherein the solvent is selected from the group consisting of toluene, benzene, xylene, acetone and methylethylketone.

9. A process according to claim 2 wherein the alkali metal acid acceptor and amine are premixed and then reacted with the cyanuric chloride.

10. A process according to claim 1 wherein 2,4-dichloro-6-isopropylamino-s-triazine is obtained by reacting a toluene solution containing cyanuric chloride with isopropylamine in a two-phase organic/aqueous medium containing an alkali metal hydroxide or alkali metal carbonate.

11. A process according to claim 10 wherein the alkali metal hydroxide is sodium hydroxide.

12. A process according to claim 11 wherein the isopropylamine, sodium hydroxide and water are premixed and then reacted with cyanuric chloride.

13. A process according to claim 10 wherein stoichiometric amounts of the reactants are employed.

14. A process according to claim 1 wherein the amino compound is 4,4′-diaminostilbene-2,2′-disulfonic acid or a water soluble salt thereof.

15. A process according to claim 14 wherein the water soluble salt is an alkali metal salt.

16. A process according to claim 14 wherein the reaction is conducted at a temperature between about −8° and 28°C.

17. A process according to claim 14 wherein the pH of the reaction mixture is maintained between about 6 and 7.

18. A process according to claim 14 wherein the reaction is conducted in the presence of methylethylketone or acetone.

19. A process according to claim 14 wherein the reaction is conducted in the presence of sodium carbonate.

* * * * *